United States Patent
Chng et al.

(10) Patent No.: US 7,051,154 B1
(45) Date of Patent: May 23, 2006

(54) CACHING DATA FROM A POOL REASSIGNED DISK SECTORS

(75) Inventors: YongPeng Chng, Singapore (SG); Chwee Fern Ee, Singapore (SG); Swee Kieong Choo, Singapore (SG); WeiLoon Ng, Singapore (SG)

(73) Assignee: Seagate Technology, LLC, Scotts Valley, CA (US)

( * ) Notice: Subject to any disclaimer, the term of this patent is extended or adjusted under 35 U.S.C. 154(b) by 906 days.

(21) Appl. No.: 09/620,497

(22) Filed: Jul. 20, 2000

Related U.S. Application Data

(60) Provisional application No. 60/145,498, filed on Jul. 23, 1999.

(51) Int. Cl.
*G06F 12/02* (2006.01)

(52) U.S. Cl. .................. 711/113; 711/112; 711/118; 711/165; 714/8

(58) Field of Classification Search ............ 369/47.44, 369/53.12, 53.15, 53.17, 53.35, 53.42, 176; 710/21; 711/1, 4, 111, 112, 113, 117, 118, 711/121, 126, 129, 165; 714/6, 7, 8
See application file for complete search history.

(56) References Cited

U.S. PATENT DOCUMENTS

| | | | |
|---|---|---|---|
| 4,419,725 A * | 12/1983 | George et al. ............ 711/206 |
| 4,488,298 A | 12/1984 | Bond et al. |
| 4,523,275 A * | 6/1985 | Swenson et al. ............. 714/7 |
| 4,935,825 A | 6/1990 | Worrell et al. |
| 5,132,954 A | 7/1992 | Kulakowski et al. |
| 5,218,696 A | 6/1993 | Baird et al. |
| 5,233,584 A | 8/1993 | Kulakowski et al. |
| 5,235,585 A * | 8/1993 | Bish et al. ............... 369/53.17 |
| 5,271,018 A | 12/1993 | Chan |
| 5,313,612 A * | 5/1994 | Satoh et al. ............... 365/228 |
| 5,523,903 A | 6/1996 | Hetzler et al. |
| 5,533,031 A | 7/1996 | Dounn et al. |
| 5,748,578 A | 5/1998 | Schell |
| 5,761,531 A * | 6/1998 | Ohmura et al. ............... 710/21 |
| 5,768,044 A | 6/1998 | Hetzler et al. |
| 5,974,544 A * | 10/1999 | Jeffries et al. .............. 713/1 |
| 6,122,685 A * | 9/2000 | Bachmat ................... 710/18 |
| 6,189,110 B1 * | 2/2001 | Saitoh et al. ................ 714/8 |
| 6,223,267 B1 * | 4/2001 | Hodges et al. ............. 711/171 |
| 6,263,459 B1 * | 7/2001 | Schibilla .................. 714/710 |
| 6,279,089 B1 * | 8/2001 | Schibilla et al. ........... 711/111 |
| 6,301,644 B1 * | 10/2001 | Andoh et al. .............. 711/112 |
| 6,310,741 B1 * | 10/2001 | Nishida et al. .............. 360/53 |
| 6,393,580 B1 * | 5/2002 | Harada ..................... 711/112 |
| 6,526,476 B1 * | 2/2003 | Wilson et al. ............. 711/112 |

* cited by examiner

*Primary Examiner*—B. James Peikari
(74) *Attorney, Agent, or Firm*—David K. Lucente; Derek J. Berger

(57) ABSTRACT

A method to improve drive read performance in a disc drive includes powering-up a disk drive, reading reassigned sectors data from a reassign spare pool, and storing the reassigned sectors data in a reassigned cache segment. This method also includes initiating a read request, detecting a reassigned sector within the read request, and determining whether the requested sector can be located in the reassignment cache. If the reassigned sectors are found in the cache, then the method includes transferring the reassigned sector data from the reassignment cache to the read buffer or directly to the requesting host computer. If the reassigned sectors are not found in the cache, then the method includes seeking to the reassignment spare pool to fetch as much reassigned sectors data as the reassignment cache can hold. In another embodiment, the reassigned sectors data stored in a reassignment cache segment is located in a buffer.

8 Claims, 5 Drawing Sheets

CACHING DATA FROM A POOL REASSIGNED DISK SECTORS

RELATED APPLICATION

This application claims the benefit of U.S. Provisional Application Ser. No. 60/145,498, filed Jul. 23, 1999 under 35 U.S.C. 119(e).

FIELD OF THE INVENTION

The present invention relates to the field of mass storage devices. More particularly, this invention relates to the accessing of data in a reassigned sector of a rotating media storage.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that is flies over the disc. The slider is passed over the disc in a transducing relationship with the disc. Most sliders have an air-bearing surface ("ABS") which includes rails and a cavity between the rails. When the disc rotates, air is dragged between the rails and the actuator assembly is moved to the required position and held very accurately during a read or write operation using the servo information.

During the manufacturing process of a mass storage device, all defective sectors found during media test are identified as bad to avoid any further usage. These defects are known as manufacturer's defects and are compiled into a defect list, which is then stored in a reserved area on the disk.

When a storage device is operational out in the field, additional sectors on the media may become defective. These defective sectors are known as "grown" defects.

Currently, the disk controller/firmware uses two types of a defect management method to avoid and compensate for these defective sectors. The first method is known as "defect slipping"and is used to compensate for the manufacturing defects. The second method is known as "defect reassignment" and is used to compensate for grown defects. Using the defect slipping process, defects found during the manufacturing process are slipped. That is, the defective sectors are simply skipped, and sector numbering is continued at the next available good sector. The unused sectors located at the end of the disk are used to replace the lost sectors. This is one method as all the data sectors can be accessed in a contiguous sequence in one revolution.

In the defect reassignment process, when a new defect is found in a sector during disk operation, that defective sector will have its logical block address reassigned to a reassign spare pool. More specifically, the reassign spare pool, usually located at the end of the disk or tracks not used by user data, contains a number of unused sectors and are used to replace the defective sectors. The defect slipping method cannot be performed on grown defects found after the manufacturing process because the subsequent sectors already have data written in them. Changing the logical block address of these sectors would result in data lost or data miscompare, hence the defect reassignment method is used.

When a "grown defect" is detected, the logical block address corresponding to the "grown defect" location is reassigned to the reassign spare pool. The reassign spare pool normally resides at the end of the disk. When accessing the reassigned sector during read/write operation, extraneous seeks are required in order to retrieve the data which slows down the access time.

What is needed is a disc drive that operates with improved read/write performance when faced with "grown defects." An improved method of defect management that eliminates extraneous seeks when attempting to retrieve data and permits all data sectors to be accessed in a continguous sequence in one revolution and an apparatus to implement such a method, is also needed.

SUMMARY OF THE INVENTION

A method to improve drive read performance in a disc drive includes powering-up a disk drive, reading reassigned sectors data from a reassign spare pool, and storing the reassigned sectors data in a reassigned cache segment. This method also includes initiating a read request, detecting a reassigned sector within the read request, and determining whether the requested sector can be located in the reassignment cache. If the reassigned sectors are found in the cache, then the method includes transferring the reassigned sector data from the reassignment cache to the read buffer or directly to the requesting host computer. If the reassigned sectors are not found in the cache, then the method includes seeking to the reassignment spare pool to fetch as much reassigned sectors data as the reassignment cache can hold. In another embodiment, the reassigned sectors data stored in a reassignment cache segment is located in a buffer.

An information handling system is also disclosed. It comprises a base, a disc rotatably attached to the base, and an actuator assembly movably attached to the base. The actuator assembly includes a voice coil attached to the actuator assembly. At least one magnet attached to the base and positioned near the voice coil to form a voice coil motor. The information handling system also includes a memory which includes a reassignment cache. The reassignment cache stores reassigned sectors data. In one embodiment, the information handling system may also include data control circuitry. The cache includes a segment that is reserved specifically for storing reassigned sectors data. The information handling system may include reassigned sectors data control circuitry. The reassigned sectors data control circuitry determines whether a sector, requested in a read operation, is located in the reassignment cache.

A disc drive is also disclosed. The disc drive includes a base, a disc rotatably attached to the base and an actuator attached to the base. The disc drive further includes a means for caching reassignment spare sector data in the disc drive.

Advantageously, the present invention allows an information handling system or a rotating mass storage device to operate with improved read/write capability when faced with "grown defects." The present invention prevents the undesirable need to engage in extraneous seeks when attempting to retrieve data from a reassigned memory sector. This invention also permits all data sectors to be accessed in a contiguous sequence in one revolution. The invention allows data to be accessed faster, which appreciably shortens access time over the prior art.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
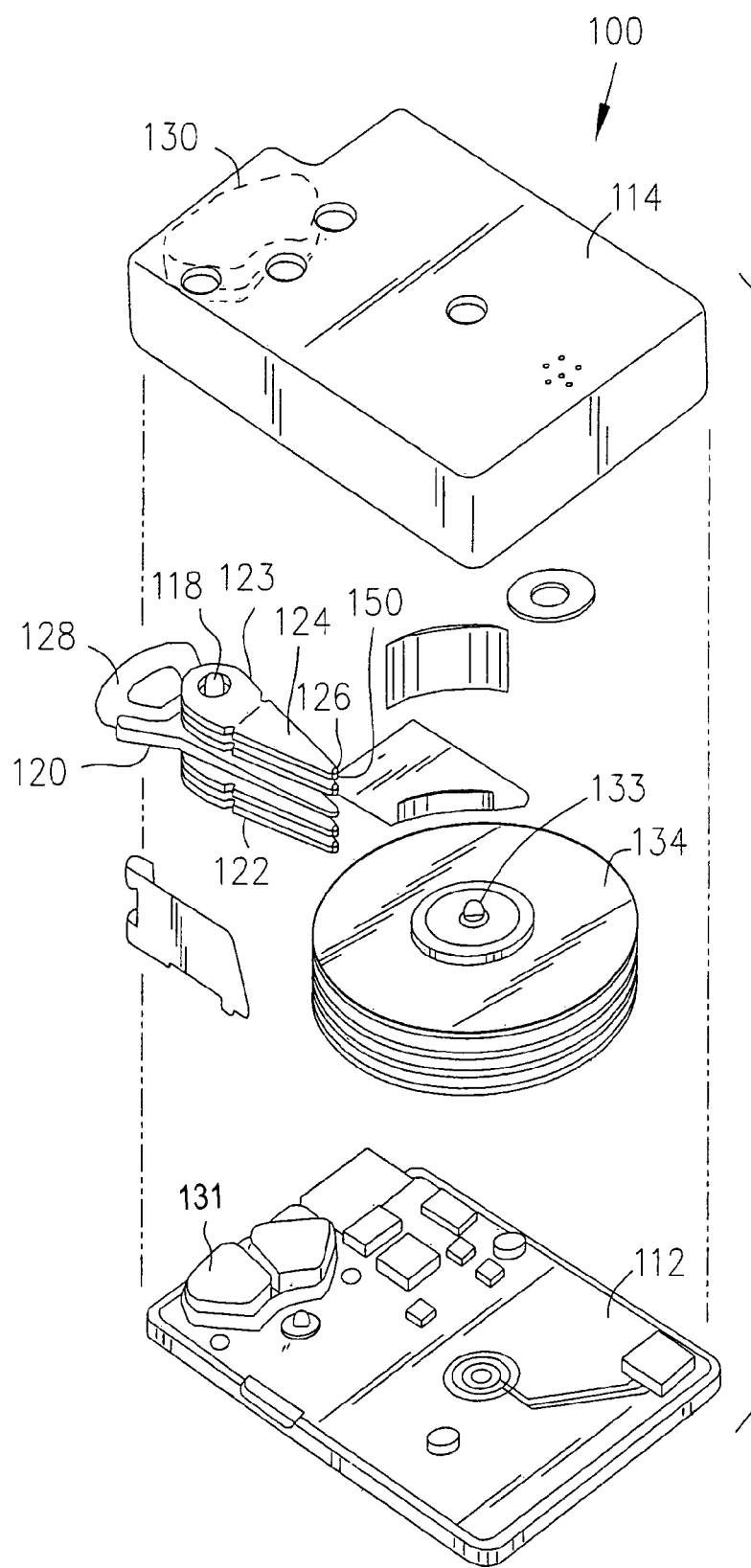
FIG. 1 is an exploded view of a disc drive

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is often called the head. It should be noted that many sliders have one transducer 150 and that is what is shown in the figures. It should also be noted that this invention is equally applicable to sliders that have more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Figure 2:
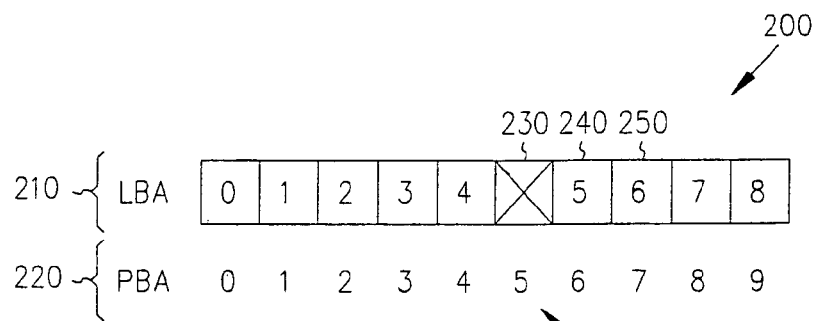
FIG. 2 is a sector layout with physical sector layout issued in the defect-slipping process.

FIG. 2 is an illustration of a sector layout 210 with physical sector layout 220 used in the defect-slipping process. Shown are logical block sectors, or sector layout, 210 with a defective sector, a "factory defect," at a certain logical block address (LBA) 230 and the corresponding physical sector layout 220 and physical block addresses (PBA) 235. Defects found during the manufacturing process are slipped. The defective sector is simply skipped to the next available good sector. That is the data of LBA 230, a defective sector, is moved back to the next good sector, here LBA 240. Notice all LBAs following 240 are "slipped" back accordingly, e.g., the data of 240 is moved to LBA 250 and so on. As illustrated in the figure, the defective sector is at physical block address (PBA) five, which has a reference number 235, and all physical sectors after sector five will have their logical block address (LBA) slipped by one.

Figure 3:
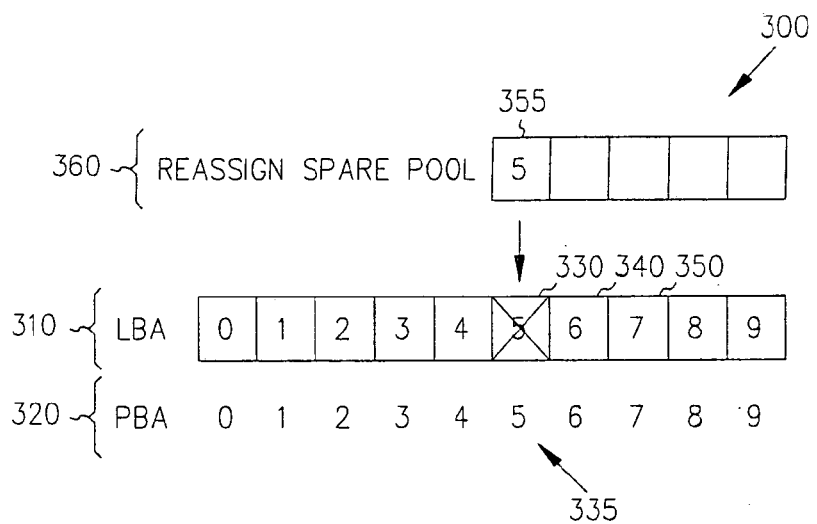
FIG. 3 is an illustration of a sector layout with physical sector layout used in the defect reassignment methodology.

FIG. 3 is an illustration of a sector layout 310 with physical sector layout 320 and a reassign spare pool 360 used in the defect reassignment methodology. Shown are logical block sectors, or sector layout, 310 with a defective sector, a "grown defect," at a certain logical block address (LBA) 330 and the corresponding physical sector layout 320 and physical block address (PBA) 335. Also shown is a reassign spare pool 360, which is usually located at the end of the disk. The reassign spare pool 360 contains a number of unused sectors and are used to replace the defective sectors, such as 335. When the "grown defect" is detected, the PBA five, having a reference number 335, is reassigned to sector 355 of the reassign spare pool 360. When accessing the data during a read/write operation at LBA five 330, a seek must be performed to the reassign spare pool 360, to obtain the data associated with LBA five in light of the defect found at PBA five 335.

Figure 4:
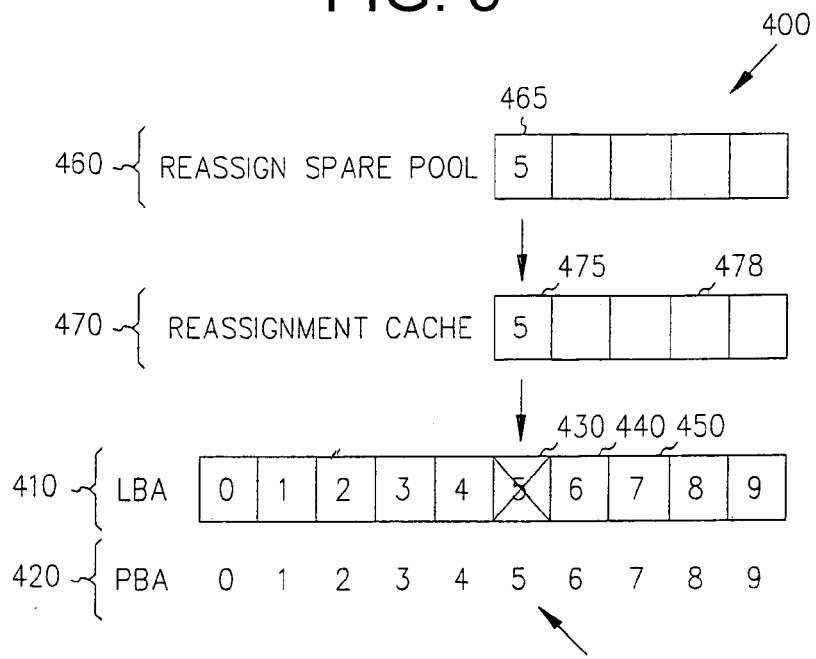
FIG. 4 is an illustration of a logical sector layout with a physical sector layout along with a reassign spare pool and a reassignment cache, according to the present invention.

FIG. 4 is an illustration of a sector layout 410 with a physical sector layout 420 along with a reassign spare pool 460 and a reassignment cache 470, according to the present invention. Shown are logical block sectors, or sector layout, 410 with a defective sector, a "grown defect," 430 at a certain logical block address (LBA) 430 and the corresponding physical sector layout 420 and physical block address (PBA) 435. Reassign spare pool 460, is usually located at the end of the disk. The reassign spare pool 460 contains a number of unused sectors and can be used to replace the defective sectors, such as PBA five 435. FIG. 4 shows a defect management scheme according to the present invention. When the disk drive is powered-up, the reassigned sectors data are read from the reassign spare pool 460 and stored in a reassigned cache segment 478. When a read request includes an LBA that has been reassigned, or includes a defective sector ("grown defect"), the reassigned sectors data control circuitry determines whether the requested sector can be found in the reassignment cache, 470. If the request is successful, the data from the reassignment cache 470 will be transferred to the read buffer with no extra seek required as shown in FIG. 4.

Figure 5:
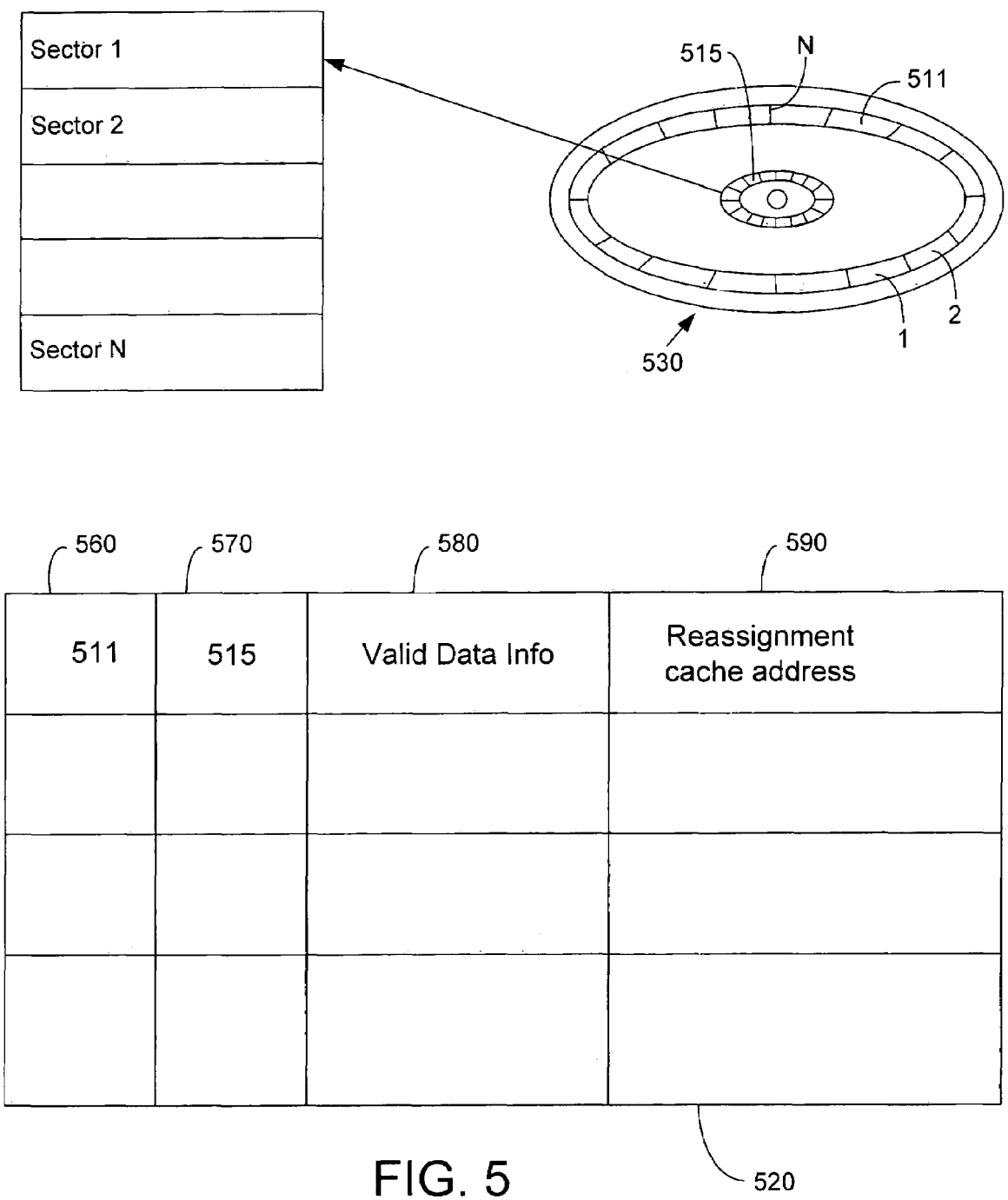
FIG. 5 illustrates a high-level view of one information handling system according to the present invention.

FIG. 5 illustrates a high-level view of one information handling system 500 according to the present invention. The information handling system 500 will also be used to discuss one method to improve drive read performance in a disc drive. Shown is a 1–N sector disc 530, which includes a reassign spare pool 515, a reassignment directory 520, a reassignment cache 540 and a read buffer 550. When a defective sector 511 of the disc 530 is encountered, the data stored in that sector is stored in a sector of the reassign spare pool 515. In one method, the reassigned sectors data is read from a reassign spare pool 515 and is stored in a reassignment cache 540. When an initiated read request is stored, the defective sector 511, where the reassigned sectors data once resided, leads to the reassignment directory 520 being examined to determine whether the reassigned sectors data requested is located in the reassignment cache 540. In one embodiment, the reassignment directory 520 holds the address of the defective sector 511, in section 560, the address of the corresponding reassign spare pool 515 location, in section 570, and the address of the reassignment cache 540 where the requested reassigned sectors data is located, which is stored in section 590. Upon examining the reassignment directory 520, if it is found that the reassignment cache 540 does hold the requested reassigned sectors data, the data is transferred to the read buffer 550 for further processing. In one embodiment, whether the reassignment cache 540 holds the requested reassigned sectors data is determined by examining the data in the validity section 580. According to another embodiment of the present invention, if the requested reassigned sectors data is not located in the reassignment cache 540, or a cache miss has occurred, then the method includes seeking to the reassign spare pool 515 to fetch as much reassigned sectors data as the reassignment cache 540 can hold then the reassignment directory 520 is re-examined. This process is repeated until the requested reassigned sectors data is read during the seek to the reassign spare pool which includes the requested reassigned sector.

Figure 6:
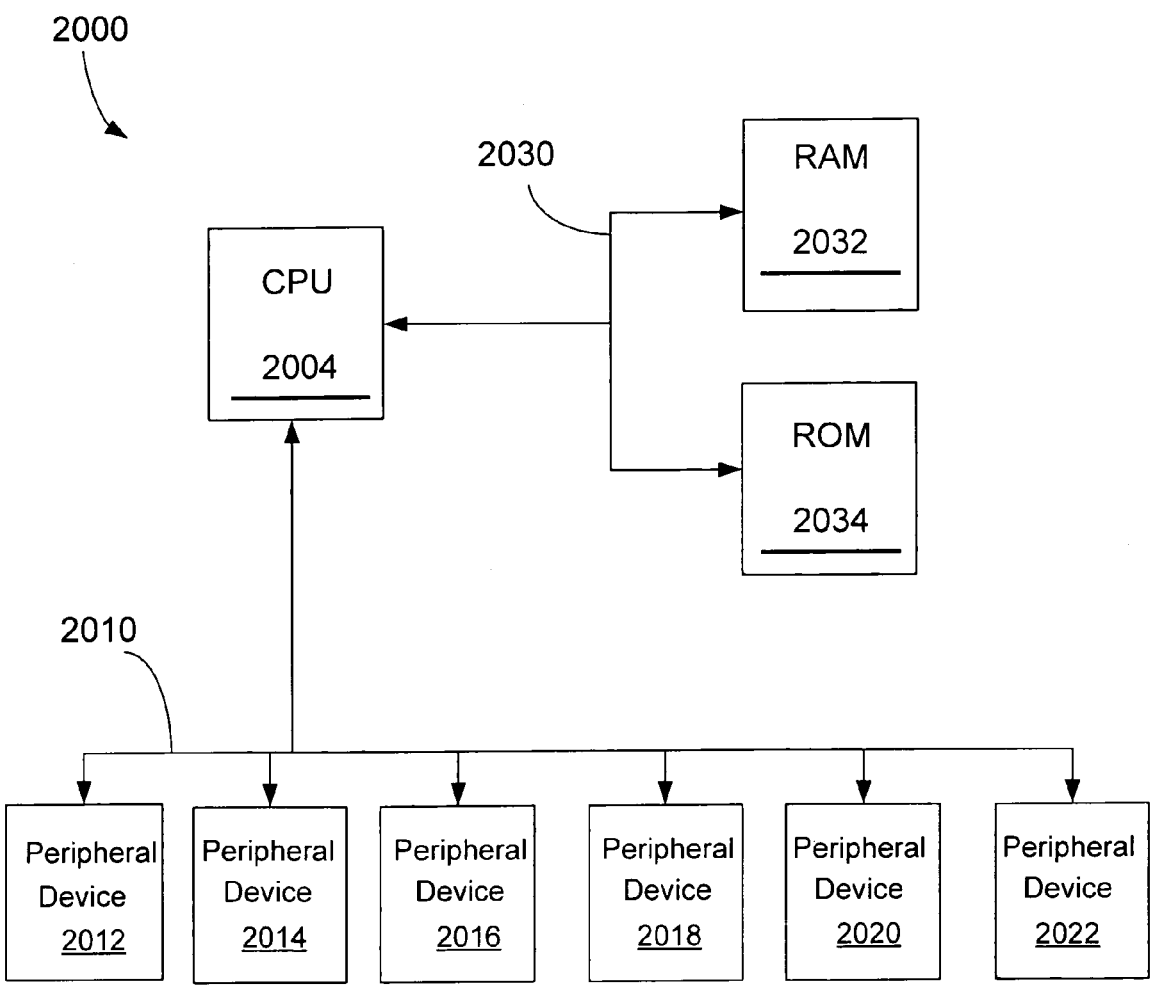
FIG. 6 is a schematic view of a computer system.

FIG. 6 is a schematic view of a computer system. Advantageously, the invention is well-suited for use in a computer system 2000. The computer system 200 may also be called an electronic system or an information handling system and includes a central processing unit, a memory and a system bus. The information handling system includes a central processing unit 2004, a random access memory 2032, a read-only memory 2034, and a system bus 2030 for communicatively coupling the central processing unit 2004 and the memories 2032, 2034. The information handling system 2000 may also include an input/output bus 2010 and several peripheral devices, such as 2012, 2014, 2016, 2018, 2020, and 2022, may be attached to the input/output bus 2010. Peripheral devices may include hard disc drives, magneto optical drives, floppy disc drives, monitors, keyboards and other such peripherals. Any type of disc drive may use the method for loading or unloading the slider onto the disc surface as described above.

Figure 7:
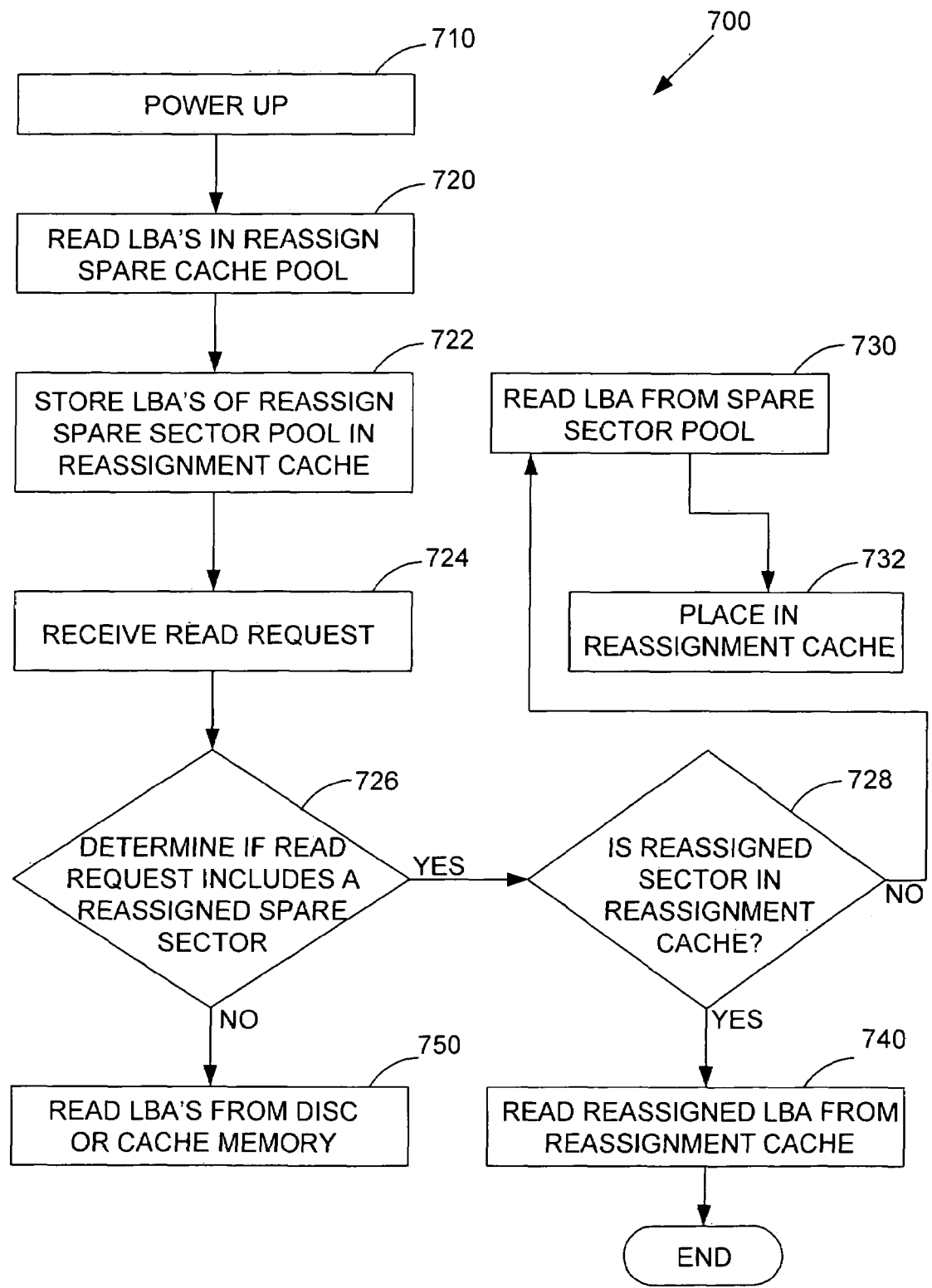
FIG. 7 is a flow diagram of the method for handling data.

FIG. 7 is a flow diagram of the method for handling data and specifically for the method of reading sectors that have been reassigned and placed into the reassign spare pool on a disc in a disc drive 100. The method 700 includes powering up the disc drive 710 and then reading the logical block addresses (LBAs) in the reassigned spare pool, as depicted by step 720. Generally, the LBAs in the reassign spare pool are read close to the time the disc drive 100 is powered up. It should be noted, however, that reading the LBAs in the reassign spare pool can be done at various times during the operation of the disc drive. In fact, if the size of the reassignment cache were not allowed to hold all the LBAs in the reassign spare pool, then the sectors in the reassigned spare pool will have to be read periodically during the operation of the disc drive. After reading the LBAs in the reassign spare pool, as depicted by reference numeral 720, the data of the LBAs of the reassign spare pool are stored in a reassignment cache, as depicted by reference numeral 722. The host computer will then generate a read request which will be received by the disc drive, as depicted by reference numeral 724. The read request will be examined to determine if the read request includes a sector that has been reassigned to the reassign spare pool, as depicted by decision box 726. If the read request does not include a reassigned sector, then the disc drive reads the LBAs from the disc or from cache memory, as depicted by reference numeral 750. In many disc drives, the LBAs read from a disc which is near a previous read are stored in cache memory. This particular scheme provides for faster access to data on the disc since generally for a high percentage of the read requests, the data associated with subsequent read requests is very near to the data for a previous read request. If the read request includes a sector that has been reassigned to the reassign spare pool, it is next determined whether the reassigned sector is in the reassignment cache, as depicted by reference numeral 728. The reassignment cache, as mentioned earlier, is a part of the cache memory associated with the disc drive. If the reassigned sector is in the reassignment cache, then the reassigned LBA is read from the reassignment cache, as depicted by reference numeral 740. If the reassigned sector is not in the reassignment cache, then the reassigned LBA is read from the reassign spare pool, as depicted by reference numeral 730. The next step is to place the read LBA into the reassignment cache, as depicted by reference numeral 732. Then the reassigned LBA can be read from the reassignment cache, as depicted by reference numeral 740. It should be noted that when the LBA of the reassign spare pool is not in the reassignment cache, the actuator is moved to the location where the reassign spare pool is located and then the LBA needed to fill the read request is read. In addition, other LBAs are added to the reassignment cache. For example, it should be noted that all LBAs are in sequential order and, therefore, when reading the reassign spare pool, it would make sense to intelligently gather the closest LBAs to the target LBA of the read request. For example, if the read request required the data of the logical block address having the number 5,000 associated therewith, then it would make sense to take the closest logical block addresses with the reassign spare pool and add these to the reassignment cache memory. For example, if the LBA having the reference number 5,000 is sought, it would make sense to also read the LBAs 4,995 and 5,020, 5,030 that are within the spare sector pool. In essence, this recognizes that the subsequent reads, will be to data that is near the current read. By placing the logical block addresses that are close to the currently sought-after logical block address in the reassign spare pool back into the reassignment cache memory, this will increase the probability that on subsequent reads, the reassignment cache will include reassigned sectors that will be the subject of the subsequent reads.

Advantageously, the present invention allows an information handling system or a mass storage device, for example, to operate with improved read/write capability when faced with "grown defects." The present invention prevents the undesirable need to engage in extraneous seeks when attempting to retrieve data from a reassigned memory sector. This invention also permits all data sectors to be accessed in a contiguous sequence in one revolution. Independently, these features allow for faster data access time, but this invention offers the benefit of both and thus appreciably speeds up access time over the prior art.

CONCLUSION

In conclusion, a method to improve drive read performance when "grown defects" are present is disclosed. The method involves powering-up a disk drive, reading the reassigned sectors data from the reassign spare pool 515, storing the reassigned sectors data in a reassignment cache segment 540, initiating a read request and verifying whether the requested sector can be located in the reassignment cache 540 when a reassigned sector is encountered during a read request. The method further includes determining whether the read request is successful transferring reassigned sector data from the reassignment cache to the read buffer 550, when the read request is successful and seeking to the reassignment cylinder, or reassignment sector pool, 515 to fetch as much reassigned sectors as the reassignment cache 540 can hold. In one embodiment, the storing step includes storing the reassigned sectors data in a reassignment cache segment 540 located in the buffer ram 550.

Also disclosed is an information handling system. The information handling system includes a base 112, a disc rotatably attached to the base, an actuator assembly 120 movably attached to the base 112, the actuator assembly 120 further comprising a voice coil 128 attached to the actuator assembly 120, at least one magnet (either 130 or 131) attached to the base 112 and positioned near the voice coil 128 to form a coil motor and a cache memory 540. The cache 540 contains a segment that is reserved specifically for storing reassigned sectors data.

Another information handling system is disclosed according to the present invention. This information handling system comprises a base 112, a disc rotatably attached to the base, an actuator assembly 120 movably attached to the base 112, the actuator assembly 120 further comprising a voice coil 128 attached to the actuator assembly 120, at least one magnet (either 130 or 131) attached to the base and positioned near the voice coil 128 to form a voice coil motor and a cache memory, wherein a segment of the cache is reserved specifically for storing reassigned data sectors. This information handling system further includes a reassigned sectors data control circuitry, wherein the reassigned sectors data control circuitry can determine whether a sector, requested in a read operation, can be located in the reassignment cache 540. In another embodiment, the reassigned sectors data control circuitry of the information handling system, includes a processor 2004 and a memory 2032 or 2034, operatively coupled to the processor 2004.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method to improve drive read performance in a disc drive, comprising the steps of:
   (a) reading data stored in reassigned sectors of a reassign spare pool on a disc; and
   (b) storing the data stored in reassigned sectors in a segment of a cache that is reserved specifically for storing the data stored in reassigned sectors and that is external to the disc.

2. The method of claim 1, further comprising the steps of:
   (c) initiating a read request;
   (d) detecting a reassigned sector of data within the read request; and
   (e) determining whether the data stored in the reassigned sector is located in the segment of cache.

3. The method of claim 2, further comprising the step of:
   (f) if the data stored in the reassigned sector is in the segment of cache, then transferring the data from the segment of cache to a read buffer.

4. The method of claim 3 including fetching as much data stored in reassigned sectors as the segment of cache can hold, if the data stored in the reassigned sector associated with the read request are not located in the segment of cache.

5. The method of claim 3, wherein the transferring step (f) further includes repeating steps (b) through (f), until as much data stored in the reassigned sectors as the segment of cache can hold has been retrieved from the reassign spare pool.

6. The method of claim 1 wherein the determining step (e) includes scanning a segment of a reassignment directory in search of the requested data stored in the reassigned sector.

7. An information handling system comprising:
   storage medium that is configured for storing data in reassigned sectors of a reassign spare pool;
   a memory external to the storage medium which includes a segment that is reserved specifically for storing data stored in the reassigned sectors; and
   a data control circuitry that controls retrieving data stored in the reassigned sectors and responsively storing the retrieved data in the segment.

8. The information handling system of claim 7, wherein the data control circuitry determines whether data stored in a reassigned sector, requested in a read request operation, is located in the memory.

* * * * *